United States Patent [19]
Coleman

[11] 3,977,573
[45] Aug. 31, 1976

[54] SEED PLANTER ATTACHMENT FOR GARDEN PLOW

[75] Inventor: Stephen N. Coleman, Dothan, Ala.

[73] Assignee: Coleman Garden Plow Manufacturing Co., Inc., Dothan, Ala.

[22] Filed: Nov. 19, 1974

[21] Appl. No.: 525,227

[52] U.S. Cl. ............................. 222/368; 222/177; 221/266
[51] Int. Cl.² .................. G01F 11/24; A01C 7/00
[58] Field of Search ............... 222/178, 177, 368; 221/263, 266; 111/77

[56] References Cited
UNITED STATES PATENTS

| 173,711 | 2/1876 | Strunk | 222/368 X |
| 509,946 | 12/1893 | Reichwein | 111/10 |
| 876,076 | 1/1908 | Mylor et al. | 111/10 |
| 2,605,023 | 7/1952 | Ward | 222/368 X |
| 3,348,504 | 10/1967 | Fischer | 111/77 X |

*Primary Examiner*—Robert B. Reeves
*Assistant Examiner*—Frederick R. Handren
*Attorney, Agent, or Firm*—Beall & Jeffery

[57] ABSTRACT

A seed planter attachment for a garden plow in which the planter is driven directly from the drive for the traction drive wheel. The planter includes a vertical seed planting disc which is rotated from such drive and which contains seed cups or pockets which pick up the seed through openings formed in the adjacent side wall of the seed hopper. The seed is discharged by gravity through a seed discharge tube extending downwardly from the seed hopper.

9 Claims, 8 Drawing Figures

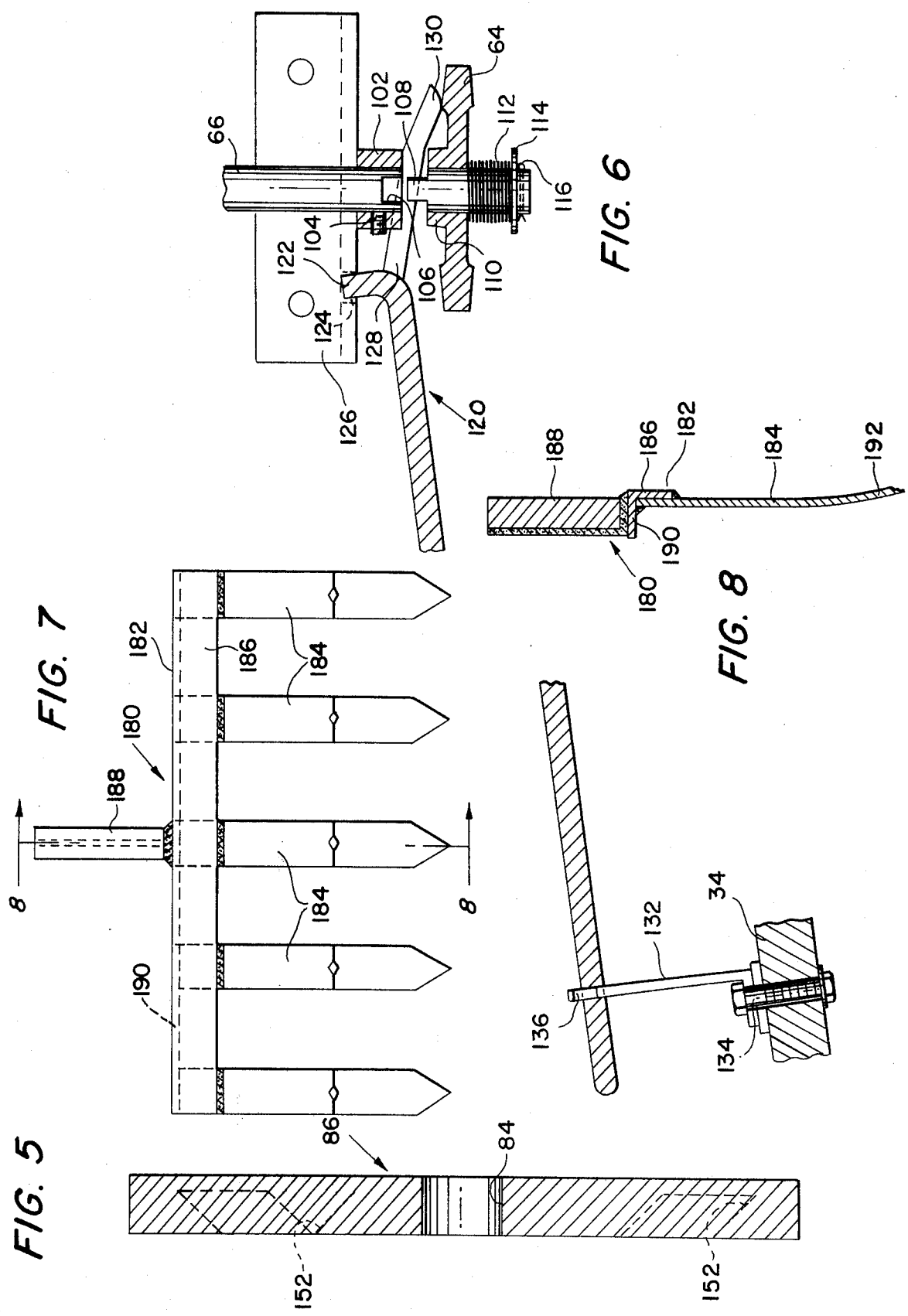

SEED PLANTER ATTACHMENT FOR GARDEN PLOW

BACKGROUND OF THE INVENTION

The present invention relates as indicated to a seed planter attachment for garden plow and relates more particularly to a planter in which a planting disc is driven from the main drive for the traction drive wheel, with the planting disc being constructed and arranged on the seed hopper for pick up and gravity dicharge of the seed through a seed discharge tube extending below the seed hopper.

The plow per se to be presently described is similar in most respects to the plow disclosed and claimed in my U.S. Pat. No. 3,734,198, granted May 22, 1973. Although the plow described in my patent has operated most satisfactorily for the purpose intended, difficulties were encountered in obtaining commercially available planter assemblies for use with the plow. As a result, the planter assembly constructed in accordance with the present invention was specifically designed for use with the garden plow described in my earlier patent.

Although seed planters have been known and used in the art for a long period of time, the planters have normally either been self-contained or used in combination with relatively large farm tractors as an accessory thereto. Exemplary of prior art planters are U.S. Pat. Nos. 49,557; 199,200; 3,240,174, and 3,489,321. None of these patents disclose a power plow which essentially comprises a garden type tractor having associated therewith a seed planter for plowing and planting in a single operation.

SUMMARY OF THE INVENTION

The primary object of the present invention is to provide a garden type power plow having associated therewith a seed planter assembly which is adapted to be driven synchronously with the drive for the traction drive wheel. A further object of the present invention is to provide a seed planter which can be quickly and easily assembled on a garden plow such as the type disclosed in my earlier patent for selective operation therewith. As noted, a single power means is adapted to drive both the traction drive wheel and the seed planter, with an operating rod being provided for coupling the main drive shaft to the drive chain for operating the planter assembly.

A further, more specific object of the invention is to provide a seed planter attachment for a garden plow in which the planter includes a planting disc mounted exteriorly of the seed hopper, with the disc being provided with a plurality of seed cups which are adapted to receive seed from the hopper through openings formed in the adjacent side wall of the hopper, with the seed being discharged from the seed cups by gravity through a seed discharge tube which extends downwardly from the seed hopper.

A still further object of the present invention is to provide a seed planter of the type described in combination with a tooth harrow which is positioned on the frame of the plow just behind the seed discharge tube for immediately covering the planted seed.

These and other objects will become apparent as the following description proceeds in particular reference to the application drawings.

BRIEF DESCRIPTION OF THE APPLICATION DRAWINGS

In the application drawings,

FIG. 1 comprises a side elevational view of a power plow having mounted thereon the seed planter attachment in accordance with the present invention;

FIG. 5 is a vertical sectional view of the planting disc,

FIG. 6 is a partially sections, fragmentary view of the operator rod and clutch assembly for the disc, FIG. 7 is a front elevational view of a modified harrow assembly, shown partially fragmented, and FIG. 8 is a vertical sectional view taken on line 8—8 of FIG. 7.

DETAILED DESCRIPTION OF THE PREFERRED EMBODIMENTS

Figure 1:
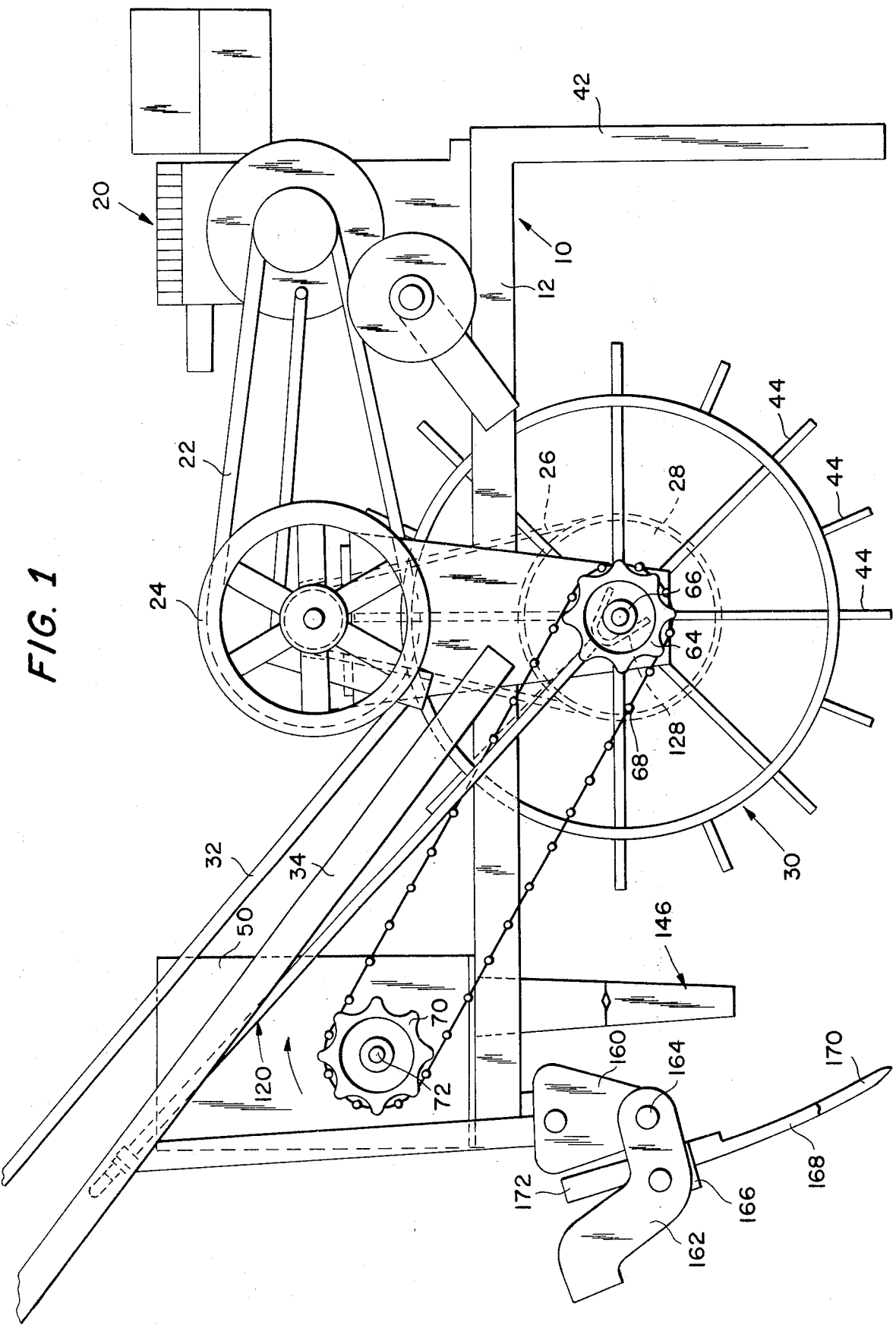
Figure 2:
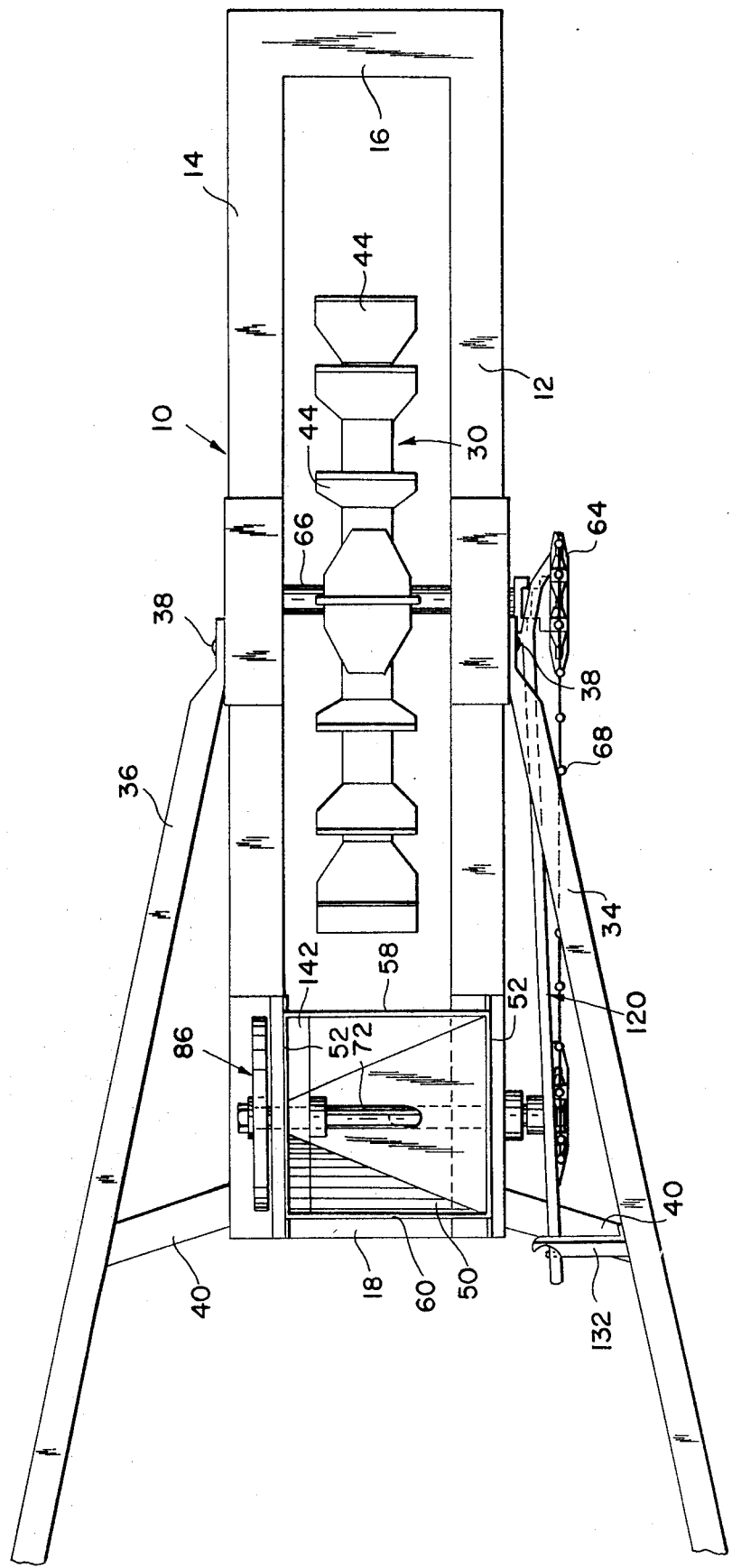
FIG. 2 is a top plan view of the apparatus of FIG. 1, with the power train being removed to more clearly expose the parts located below the same.

Referring now in more detail to the drawings, wherein like parts are indicated by like reference characters, and initially to FIGS. 1 and 2, the garden plow to which the present invention is attached includes a supporting frame generally indicated at 10 which includes horizontally extending frame members 12 and 14 which are integrally secured to a transverse frame member 16, FIG. 2, at the front ends thereof. A transverse frame member 18 is provided at the rear end of the frame members 12 and 14 for completing the main supporting frame for the plow.

A power source in the form of a gasoline engine generally indicated at 20 is carried by the frame adjacent the front thereof, with the engine operating a pulley belt 22 which is entrained around a drive pulley 24, with a further belt 26 driving a pulley 28 for driving the main traction wheel generally indicated at 30. A clutch shown schematically by the clutch operator rod 32 is provided for selective transmission of the power to the main traction wheen 30 for operating the same. Handles 34 and 36 extend upwardly from the main frame to which they are attached at their lower ends as shown at 38, with support brackets commonly designated at 40 connecting the rear end of the main frame to the handles to rigidify the handle support in such region. A generally U-shaped support stand 42 extends downwardly from the main frame at the front thereof to support the plow in its rest position.

The structure thus far described is disclosed and claimed in my U.S. Pat. No. 3,734,198 and has been illustrated and described in the present application only to provide a clear understanding of the subject matter of the present invention. The traction wheel 30 is formed with annularly spaced, transverse cleats 44 which function when the wheel is rotated through the described drive train to perforate the ground surface over which the wheel passes thereby providing the necessary traction for the plow.

Figure 3:
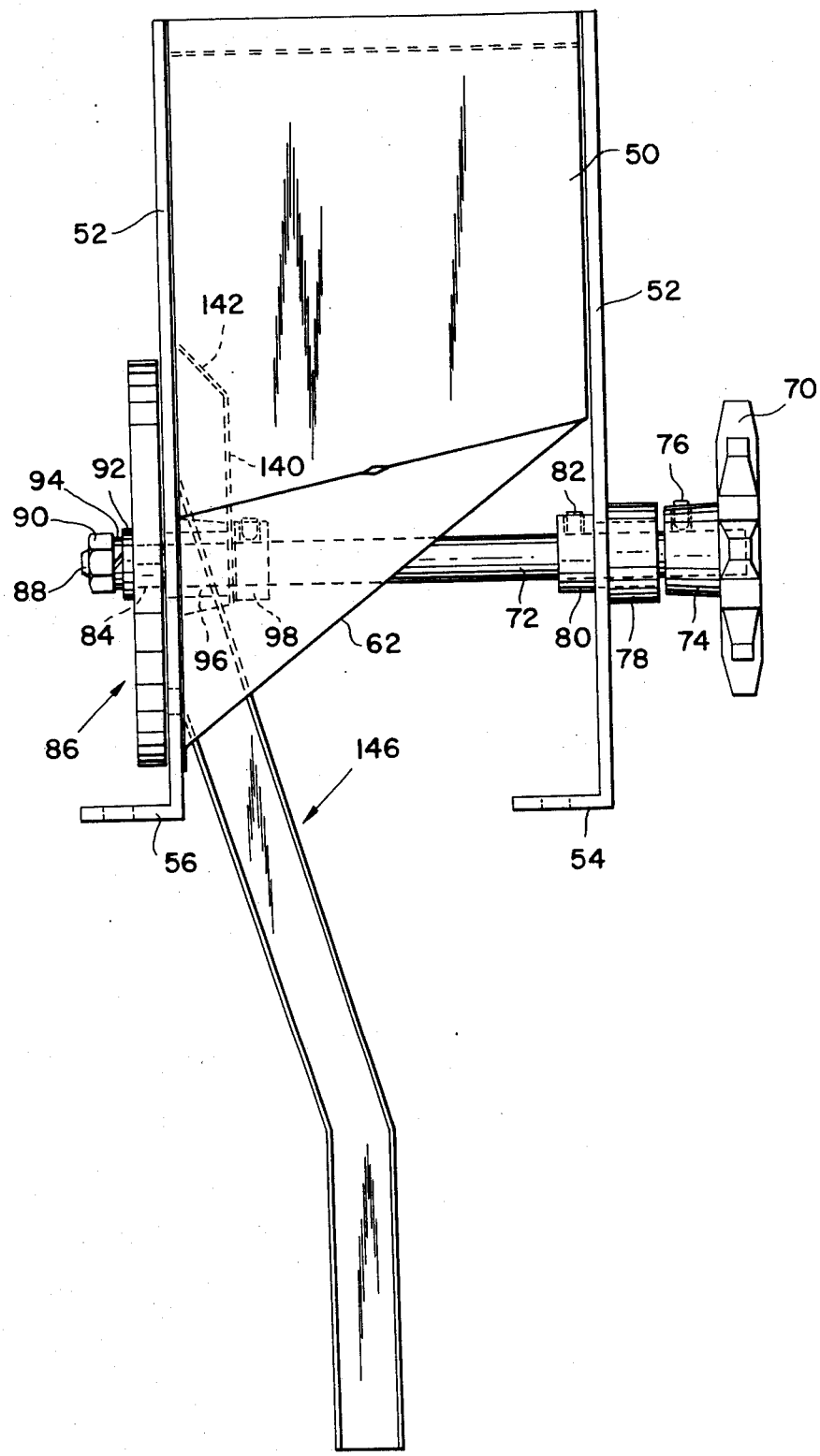
FIG. 3 is an end elevational view of the seed planter attachment.

Referring now to the seed planter attachment constructed in accordance with the present invention, a seed hopper 50 is mounted on the main frame, with the seed hopper being generally rectangular in cross section with the side walls 52 of the hopper being formed at their bottom ends with laterally extending flanges 54 and 56 which overlie and are bolted or otherwise secured to the longitudinal frame members 12 and 14. The front and rear end walls 58 and 60 are downwardly tapered from right to left as viewed in FIG. 3 and bottom wall 62 is preferably integrally formed with the front and rear end walls to permit manufacture from a single piece of sheet metal or the like. If desired, the bottom can be separately formed and attached to the front and rear end walls in any suitable manner. As shown in FIG. 3, the bottom wall 62 is also tapered from right to left as viewed therein, and the hopper walls define a seed holding compartment.

The drive train for the seed planter includes a drive sprocket 64 which can be drivingly coupled to the main drive shaft 66 for the traction drive wheel 30, with a sprocket chain 68 extending between such sprocket and a driven sprocket 70 mounted outwardly of the seed hopper. Referring to FIG. 3, the driven sprocket 70 is operatively connected to the shaft 72 through a collar 74 secured to the sprocket wheel, with a pin 76 drivingly connecting the collar 74 to the shaft. The side wall 52 adjacent the sprocket 70 is formed with an oil-impregnated bushing 78 to support the shaft 72, and a collar 80 is positioned around the shaft 72 at the inside face of the side wall 52 adjacent the sprocket, with the collar 80 being provided with a set screw 82 for engaging the shaft and preventing longitudinal movement of the shaft relative to the seed hopper.

The leading end of the shaft 72 extends through the other side wall 52, with the shaft including a section 84 which is rectangular in cross-section for receiving the seed planting disc generally indicated at 86. The shaft further includes a threaded leading end portion 88 on which is threadedly secured hex nut 90, with a plain washer 92 and a lock washer 94 completing the assembly. It will be understood that the planting disc 86 is similarly formed with a rectangular opening complemental to the shape of the shaft section 84 so that the disc is drivingly coupled to the shaft for rotation therewith. A bushing 96 similar to bushing 78 is provided on the adjacent side wall 52, and a collar 98 similar to collar 80 is positioned inwardly of the bushing 96.

As above noted, a clutch is provided for coupling the drive sprocket 64 to the main shaft 66 for the traction wheel, and such clutch assembly is shown in FIG. 6. A collar 102 extends around the shaft 66 and is pinned thereto by means of pin 104. The collar 102 is formed with diametrically opposed slots 106 at the top and bottom thereof, as viewed in FIG. 6, and the drive sprocket 64 is formed with projections 108 at the top and bottom of the hub 110 of the sprocket for engagement in the notches 106 formed in the collar 102 when the driven shaft 64 is biased toward the collar.

A compression spring 112 is positioned around the outer end of the shaft 66, and a washer 114 and cotter key 116 are provided for retaining the spring on the shaft, with the spring engaging the sprocket 64 and biasing the same continually toward the collar 102.

As shown in FIG. 6, the drive sprocket 64 is shown out of engagement with the collar 102 whereby the shaft 66 can rotate without drive connection to the sprocket 64, in which position the garden plow can operate when the seed planting function of the plow is not used.

An operating rod generally indicated at 120 is provided for controlling the clutch engagement of the drive sprocket 64 to the shaft 66, with the rod having a lateral extension 122 engagable in an opening 124 in the frame member 126 and being further formed with a bifurcated or forked end portion 128 the opposed legs of which extend to either side of the collar 102 and the hub portion 110 of the drive sprocket 64, with only one of such legs appearing in FIG. 6. The leading ends 130 of the fork section 128 of the operating rod engage the drive sprocket 64 as shown in FIG. 6 for forcing the same outwardly out of drive connection with the collar 102 and thus the drive shaft 76.

The opposite end of the rod extends through a retaining bracket 132 which is secured to the handle 34 through a bolt assembly 134. The retaining bracket is formed with an inclined slot 136 which permits the rod 120 to be moved between its FIG. 6 position and a position in which the leading ends 130 of the forked section 128 of the rod are out of engagement with the drive sprocket thereby permitting the spring 112 to force the drive sprocket into driving engagement with the collar 102 which is pinned to the shaft 66. In this manner, by simple movement of the operator rod in the retaining bracket, the drive sprocket 64 can be engaged or disengaged from the drive shaft 66.

Figure 4:
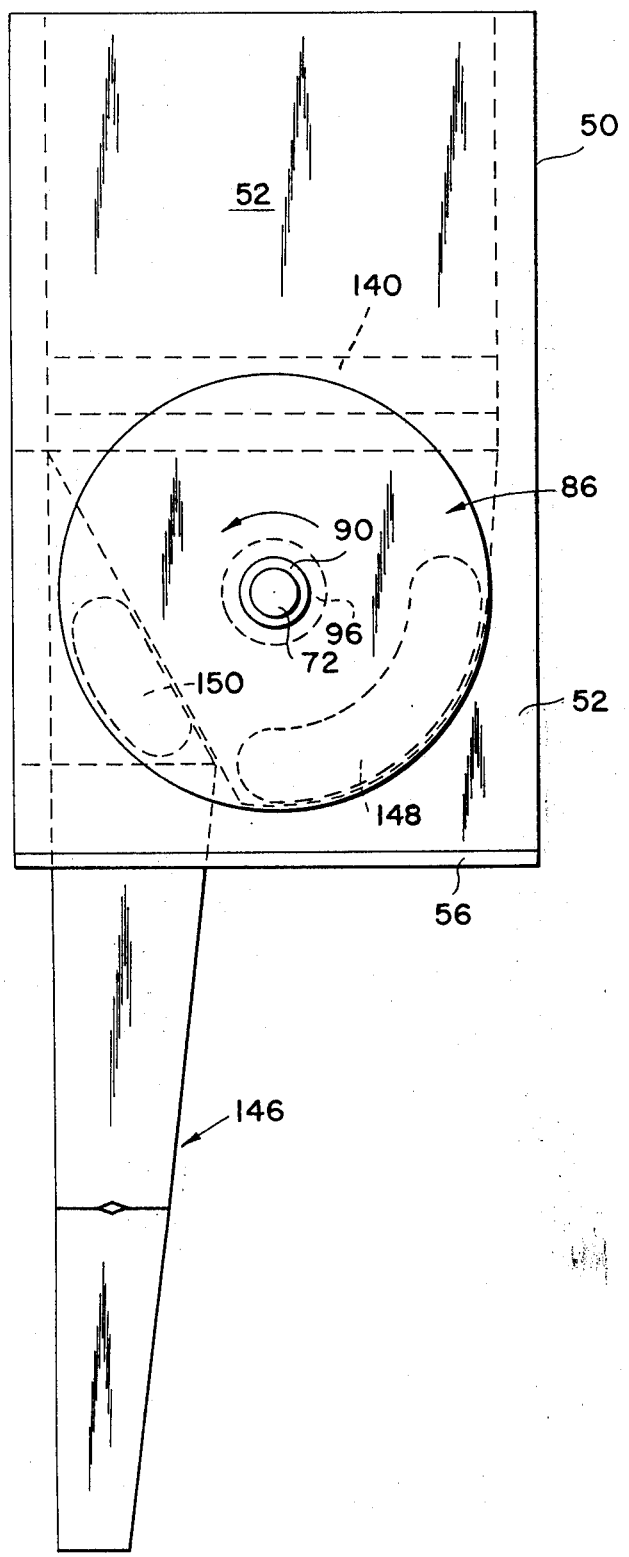
FIG 4 is a side elevational view of the seed planter attachment viewed from the left of FIG. 3.

Referring to FIGS. 3 and 4, the seed hopper is formed with a partition 140 which extends substantially along the entire side wall 52 of the hopper, with the partition 140 having an inclined top wall portion 142. The vertically extending main wall portion of the partition is formed with an opening to receive the drive shaft 72. The collar 98 functions to maintain the partition in its position shown in FIG. 3. The side edges of the partition conform to the front and rear walls of the hopper and the bottom of the partition is open whereby the interior of the partition is isolated from the seed in the hopper except through the bottom of the partition to which the seed in the hopper gravitates, with the inclined bottom wall 62 of the hopper facilitating flow to the partition.

A seed discharge tube generally indicated at 146 is secured to the side wall 52 and extends downwardly therefrom, with the tube being open at the top thereof to receive seeds delivered to the tube from the seed planting disc, with the seeds gravitating downwardly through the discharge tube 146 to the ground. As can be seen in FIG. 4, the upper end of the tube 146 is open to the exterior of the hopper itself.

As seen in FIG. 4, the side wall 52 adjacent the planting disc 86 is formed with two arcuate openings 148 and 150 through which the seed in the bottom of the hopper is picked up and discharged by the seed planting disc during rotation thereof, with the opening 150 being directly above the tube 146. To effect such pickup and discharge, the planting disc 86 is formed with a plurality of seed cups or recesses 152 spaced circumferentially around the disc. Two seed cups 152 are shown in FIG. 5, and in the preferred form, four such cups are provided spaced 90° around the disc.

It will be noted that the axis of each seed cup 152 is angled relative to the axis of the disc whereby the seeds can be picked up through the opening 148 formed in the side wall 52 and discharged through opening 150 in the side wall 52 for gravity discharge through the tube 146. The inclination of the seed cups permits such pickup through the opening 148, with the seeds being retained in each cup during further rotation due to the seed cup being positioned closely adjacent the side wall 52. As the cup rotates into alignment with the opening 150 formed in the side wall, the seed cup is oriented so that the seeds are discharged by gravity from the opening through the opening 150 and into the discharge tube 146. Continued rotation of the planting disc permits the empty seed cup to pick up further seeds when traversing the opening 148 to continue to pick up and discharge cycle. The spacing of the seed apart as the garden plow traverses the ground of course depends upon the number and spacing of the seed cups 152 formed in the planting disc. For example, with a disc approximately 5-¾ inches in diameter, the seed will be dispensed through the seed tube approximately every 4–5 inches, assuming that four seed cups are provided spaced 90° apart. The number of seeds dispensed also depends upon the size of the seed cups, and it will be apparent that the size of the cups can also be selected as desired. Preferably, several different seed planting discs are provided in accordance with the present invention, interchangable depending upon the type of seed being planted. The seed planting disc can be easily installed on or removed from the seed hopper as described in order to achieve the desired seed dispensing pattern.

Reverting to FIG. 1, a bracket 160 is carried by the frame assembly of the plow, and a yoke 162 is pivotally connected to the bracket through pivot pin 164. A tooth harrow is operatively coupled to the yoke and includes a bracket 166 to which are mounted teeth 168 and 170. The teeth 168 and 170 are spaced on the bracket 166 so as to be positioned on either side of the seed discharge tube 146 whereby the earth dug up by the teeth 168 and 170 can be moved over the planted seeds during movement of the garden plow. The bracket 166 is rigidly secured by welding or the like to the rod 172 which extends upwardly through the yoke member 162.

A modified harrow attachment is shown in FIGS. 7 and 8. In this form the harrow attachment is generally indicated at 180 and comprises a generally L-shaped support bracket 182 to the front leg of which are mounted the harrow teeth, which are five in number in the form shown and commonly designated at 184. The teeth 184 can be secured to the front leg 186 of bracket 182 by any suitable means such as welding, as shown. A shaft or stem 188 is mounted, as by welding, to the top leg 190 of the bracket 182 and extends through a yoke similar to the yoke 162 shown in FIG. 1. The mounting of the stem 188 in the yoke is such as to be able to vertically adjust the depth of penetration of the teeth 184 in the ground, with the vertical adjustment preferably being effected in the manner shown in my earlier U.S. Pat. No. 3,734,198, referred to above. By vertically adjusting the harrow attachment, relatively lesser penetration can be achieved for turning over grass, or deeper penetration can be effected as in normal cultivation. The use of five spaced teeth permits a wide cultivation path to be achieved.

As seen in FIG. 8, the bottom of each tooth 184 is curved inwardly as shown at 192 with the tip being bevelled at the front and generally triangular in shape to provide a sharp point for earth penetration. The harrow attachment 180 can replace the harrow attachment shown in FIG. 1 when it is desired to cultivate rather than simply cover the seeds discharged from the planter disc, with the two-tooth harrow shown in FIG. 1 being specifically designed for covering seed.

It will thus be seen that the objects of the invention have been accomplished. The novel seed planter can be quickly and easily mounted on the frame of the garden plow and can be selectively operated by means of an operator rod conveniently accessible from the handle of the plow. A single power means is provided for rotating the main traction wheel and the seed planter disc whereby the seed is planted in the desired amounts and in the desired increments of space, as controlled by the construction of the seed planting disc and more particularly the seed cups formed therein. A tooth harrow attachment is positioned on the frame of the garden plow immediately behind the seed discharge tube for covering the seeds discharged through the tube from the seed hopper, with the combination providing the desired result in a continuous operation. An alternative form of harrow attachment is interchangeable with the harrow used for seed cover for performing normal cultivating tasks, with the depth of penetration of the harrow teeth being adjustable as desired depending upon the specific task. It will further be noted that the width of the entire plow is such as to permit cultivation of crops between rows regardless of crop height, when the cultivating harrow attachment is employed subsequent to crop growth.

I claim:
1. A seed planter attachment for a plow comprising:
   a. a seed hopper mounted on the frame of said plow, said hopper including walls which define a seed holding compartment, said walls including spaced side walls one of which is formed with first and second spaced openings therethrough, said first opening communicating with the seed in said hopper;
   b. a seed planting disc mounted for rotation exteriorly of said one side wall of said hopper, said disc being formed with at least one seed cup in the face thereof adjacent said side wall which does not extend through said disc, said cup during rotation of said disc passing over said openings in said one side wall;
   c. a seed discharge tube mounted on said side wall and having at least a portion thereof extending through said compartment, said tube communicating at its upper end with said second opening, and
   d. means for rotating said disc whereby seeds are picked up by said seed cup from said hopper through said first opening and deposited through said second opening to said discharge tube for gravity discharge therethrough.

2. The combination of claim 1 wherein a plurality of seed cups are provided in said face of said disc in circumferentially spaced relation, said seed cups being in the form of recesses formed in said face and not extending through said disc, the axis of said recesses being inclined relative to the axis of said disc thereby facilitating pickup of seeds at said one opening and discharging said seeds through said second opening.

3. The combination of claim 1 wherein said hopper includes front, rear, side and bottom walls, said bottom wall being downwardly inclined toward said one side wall to facilitate seed flow to said side wall, a partition located in said hopper over said one side wall and at least partially above said first opening, and wherein said second opening is formed in said side wall to one side of said partition.

4. The combination of claim 1 wherein said means for rotating said disc comprises a shaft rotatably coupled to said disc and extending transversely through said hopper, a driven sprocket coupled to said shaft, and a drive sprocket drivingly connected to said driven sprocket and operatively connected to the main power source for said plow.

5. The combination of claim 4 further including clutch means for engaging and disengaging said drive sprocket from the main drive shaft of said main power source, said clutch means including an operator rod for selective movement of said drive sprocket into and out of engagement with said main drive shaft.

6. The combination of claim 5 wherein said main drive shaft has fixedly mounted thereon a collar formed with diametrically opposed openings, said drive sprocket being freely rotatable on said main drive shaft and including a hub portion formed with diametrically opposed projections adapted to mate with said openings in said collar, and spring means mounted around said main drive shaft outwardly of said drive sprocket for urging said drive sprocket toward said collar on said main drive shaft.

7. The combination of claim 6 wherein said operator rod is operatively connected at its outer end to a bracket carried by a handle of the plow, the inner end of said rod including a lateral extension positioned in an opening in the frame of the plow and a bifurcated end portion extending on either side of said main drive shaft and directly engageable with said drive sprocket for moving the same outwardly to disengage said hub portion of said drive sprocket from said collar.

8. The combination of claim 1 further including a plurality of harrowing teeth positioned on said frame behind said seed discharge tube for moving the earth over said discharged seed.

9. The combination of claim 8 wherein said teeth are carried by a bracket the upper end of which is secured to a pin which extends upwardly through a bracket assembly carried by the frame of the plow.

* * * * *